United States Patent
Fukui et al.

(10) Patent No.: US 9,894,721 B2
(45) Date of Patent: Feb. 13, 2018

(54) LIGHTING DEVICE, HEADLIGHT APPARATUS USING THE SAME, AND VEHICLE USING THE SAME

(71) Applicant: Panasonic Corporation, Osaka (JP)

(72) Inventors: Takahiro Fukui, Osaka (JP); Kazutoshi Suganuma, Niigata (JP); Toshifumi Tanaka, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 115 days.

(21) Appl. No.: 14/478,369

(22) Filed: Sep. 5, 2014

(65) Prior Publication Data

US 2015/0069908 A1    Mar. 12, 2015

(30) Foreign Application Priority Data

Sep. 10, 2013   (JP) ................... 2013-187581

(51) Int. Cl.
*H05B 33/08* (2006.01)
*B60Q 1/14* (2006.01)

(52) U.S. Cl.
CPC ....... *H05B 33/0815* (2013.01); *B60Q 1/1423* (2013.01); *H05B 33/083* (2013.01); *B60Q 2300/05* (2013.01)

(58) Field of Classification Search
CPC .............. B60Q 2300/05; B60Q 1/1423; H05B 33/083; H05B 33/0815

(Continued)

(56) References Cited

U.S. PATENT DOCUMENTS

| 7,868,563 B2 | 1/2011 | Ito et al. |
| 7,994,725 B2 | 8/2011 | Bouchard |

(Continued)

FOREIGN PATENT DOCUMENTS

| CN | 101472368 A | 7/2009 |
| JP | 2004-136719 A | 5/2004 |

(Continued)

OTHER PUBLICATIONS

English translation of Chinese Office Action and Search Report dated Mar. 16, 2016 for corresponding Chinese Application No. 201410458157.9.

*Primary Examiner* — Douglas W Owens
*Assistant Examiner* — Borna Alaeddini
(74) *Attorney, Agent, or Firm* — Renner, Otto, Boisselle & Sklar, LLP (57) ABSTRACT

A lighting device includes a power converter, a second switching element and a microcomputer. The power converter is configured to convert DC power that is received from a power supply, and supply an output obtained by the conversion to a load. The second switching element is configured to short-circuit at least one LED of a plurality of LEDs, as part of the load. The microcomputer is configured to control the power converter, and control switching on/off of the second switching element. The microcomputer is configured to reduce an output current of the power converter, in a case where a power supply voltage of the battery is a reference voltage or less. A reduction amount of the output current in an on-state of the second switching element is lower than the reduction amount of the output current in an off-state of the second switching element.

14 Claims, 8 Drawing Sheets

(58) Field of Classification Search
USPC .......... 315/307, 82, 185 R, 186, 193, 209 R,
315/210, 212, 219, 313
See application file for complete search history.

(56) References Cited

U.S. PATENT DOCUMENTS

| | | | |
|---|---|---|---|
| 8,110,989 B2 | 2/2012 | Kitagawa et al. | |
| 2004/0075393 A1* | 4/2004 | Ito | H05B 33/0845 315/77 |
| 2008/0157678 A1 | 7/2008 | Ito et al. | |
| 2009/0167187 A1* | 7/2009 | Kitagawa | H05B 33/0854 315/77 |
| 2010/0109557 A1 | 5/2010 | Bouchard | |
| 2011/0260617 A1* | 10/2011 | Tanaka | H05B 33/0815 315/82 |
| 2013/0049586 A1* | 2/2013 | Hamana | H05B 33/0884 315/82 |
| 2013/0320850 A1* | 12/2013 | Nakamura | F21S 48/1747 315/82 |
| 2015/0069908 A1* | 3/2015 | Fukui | H05B 33/0815 315/82 |

FOREIGN PATENT DOCUMENTS

| | | |
|---|---|---|
| JP | 2006-210836 A | 10/2006 |
| JP | 2008-166412 | 7/2008 |
| JP | 2010-114085 | 5/2010 |
| JP | 2010-143447 A | 7/2010 |
| JP | 2011-113643 A | 6/2011 |
| JP | 2011-233264 A | 11/2011 |
| JP | 2013-045518 A | 3/2013 |
| JP | 2013-159288 | 8/2013 |

\* cited by examiner

LIGHTING DEVICE, HEADLIGHT APPARATUS USING THE SAME, AND VEHICLE USING THE SAME

CROSS-REFERENCE TO RELATED APPLICATIONS

The application is based upon and claims the benefit of priority of Japanese Patent Application No. 2013-187581 filed on Sep. 10, 2013, the entire contents of which are incorporated herein by reference.

TECHNICAL FIELD

The disclosure relates generally to lighting devices, headlight apparatuses using the same, and vehicles using the same, and more particularly, to a lighting device which is configured to light a light source that includes a light emitting element such as a light emitting diode, a headlight apparatus using the same, and a vehicle using the same.

BACKGROUND ART

Conventionally, the number of vehicles including, as a headlight, an HID (High Intensity Discharged) lamp instead of a halogen lamp had been increased, in order to improve the visibility (brightness). However, recently, due to the improvement of luminous efficiency of an LED (light emitting diode), mass production of vehicles including, as the headlight, the LED has been already started. For example, JP2011-113643A (hereinafter, referred to as "document 1") discloses a lighting device, which is configured to light a headlight that is an LED.

The lighting device in the document 1 includes a converter, a voltage detector, a current detector, a controller and a temperature detector. The converter is configured to convert a DC voltage, received from a DC power supply, into a voltage at which a load (LED) can be lighted. The voltage detector is configured to detect an output voltage of the converter, or a value corresponding to the output voltage. The current detector is configured to detect an output current of the converter, or a value corresponding to the output current. The controller is configured to control the converter based on a value detected by the voltage detector and/or the current detector. The temperature detector is configured to detect the temperature of the lighting device, or a value corresponding to the temperature.

When the temperature detected by the temperature detector becomes higher than a predetermined temperature, the controller is configured to reduce the output current according to the elapsed time. Therefore, this lighting device can suppress an increase of a circuit loss at a high temperature, and prevent a failure in the device.

However, if the output current to be supplied to the load is reduced as the above conventional example, luminous flux of the load is decreased, and accordingly, there is a possibility that sufficient illumination cannot be provided. For example, in a case where the load is a headlight, the luminous flux of the load upon lighting of a passing light (so-called low-beam) is lower than that upon lighting of a running light (so-called high-beam). In addition, a lighting distribution area upon lighting of the low-beam is more strictly limited depending on the standard, compared with that upon lighting of the high-beam. Therefore, if the control of reducing the output current is performed upon lighting of the low-beam, illumination of the low-beam cannot be provided sufficiently, and accordingly, there is a possibility that visibility of a driver is reduced.

SUMMARY

It is an object of the present technology to provide a lighting device, which can obtain sufficient illumination from a load even while reducing an output current to be supplied to the load, a headlight apparatus using the same, and a vehicle using the same.

A lighting device according to an aspect of the present invention includes a power converter, a bypass unit, and a controller. The power converter is configured to convert DC power that is received from a power supply, and supply an output obtained by the conversion to a load in which a plurality of light emitting elements are connected in series. The bypass unit is configured to short-circuit at least one light emitting element of the plurality of light emitting elements, as part of the load. The controller is configured to control the power converter. The controller is configured to control switching a first state where the at least one light emitting element is short-circuited by the bypass unit, and a second state where the short-circuiting is opened. The controller is configured to reduce an output current of the power converter, in at least one of a case where a power supply voltage of the power supply is a reference voltage or less; a case where a temperature of the power converter is a first reference temperature or more; and a case where a temperature of the load is a second reference temperature or more. The controller is configured to control so that a reduction amount of the output current in the first state is lower than the reduction amount of the output current in the second state.

A headlight apparatus according to an aspect of the present invention includes the above-mentioned lighting device, the load, and a housing that houses the load.

A vehicle according to an aspect of the present invention includes the above-mentioned headlight apparatus, and a vehicle body to which the headlight apparatus is installed.

According to the present technology, the reduction amount of the output current is low, while the at least one light emitting element as the part of the load is short-circuited, and accordingly, it is possible to obtain sufficient illumination from the load even while reducing the output current to be supplied to the load.

BRIEF DESCRIPTION OF THE DRAWINGS

The figures depict one or more implementations in accordance with the present teaching, by way of example only, not by way of limitations. In the figures, like reference numerals refer to the same or similar elements.

DETAILED DESCRIPTION (First Embodiment)

A lighting device according to the present embodiment includes a power converter 3, a second switching element Q2 (a bypass unit) and a microcomputer 4 (a controller). The power converter 3 is configured to convert DC power that is received from a battery 7 (a power supply), and supply an output obtained by the conversion to a load 2 in which a plurality of LEDs 20 (light emitting elements) are connected in series. The second switching element Q2 is configured to short-circuit at least one LED 20 (a second light source unit 22) of the plurality of LEDs 20, as part of the load 2. The microcomputer 4 is configured to control the power converter 3. Further, the microcomputer 4 is configured to control switching on/off of the second switching element Q2 (a first state where the second light source unit 22 is short-circuited by the second switching element Q2, and a second state where the short-circuiting is opened).

The microcomputer 4 is configured to reduce an output current of the power converter 3, in at least one of a case where a power supply voltage of the battery 7 is a reference voltage or less; a case where a temperature of the power converter 3 is a first reference temperature or more; and a case where a temperature of the load 2 is a second reference temperature or more.

Further, the microcomputer 4 is configured to control so that a reduction amount of the output current in an on-state of the second switching element Q2 (in the first state) is lower than the reduction amount of the output current in an off-state of the second switching element Q2 (in the second state).

Figure 1:
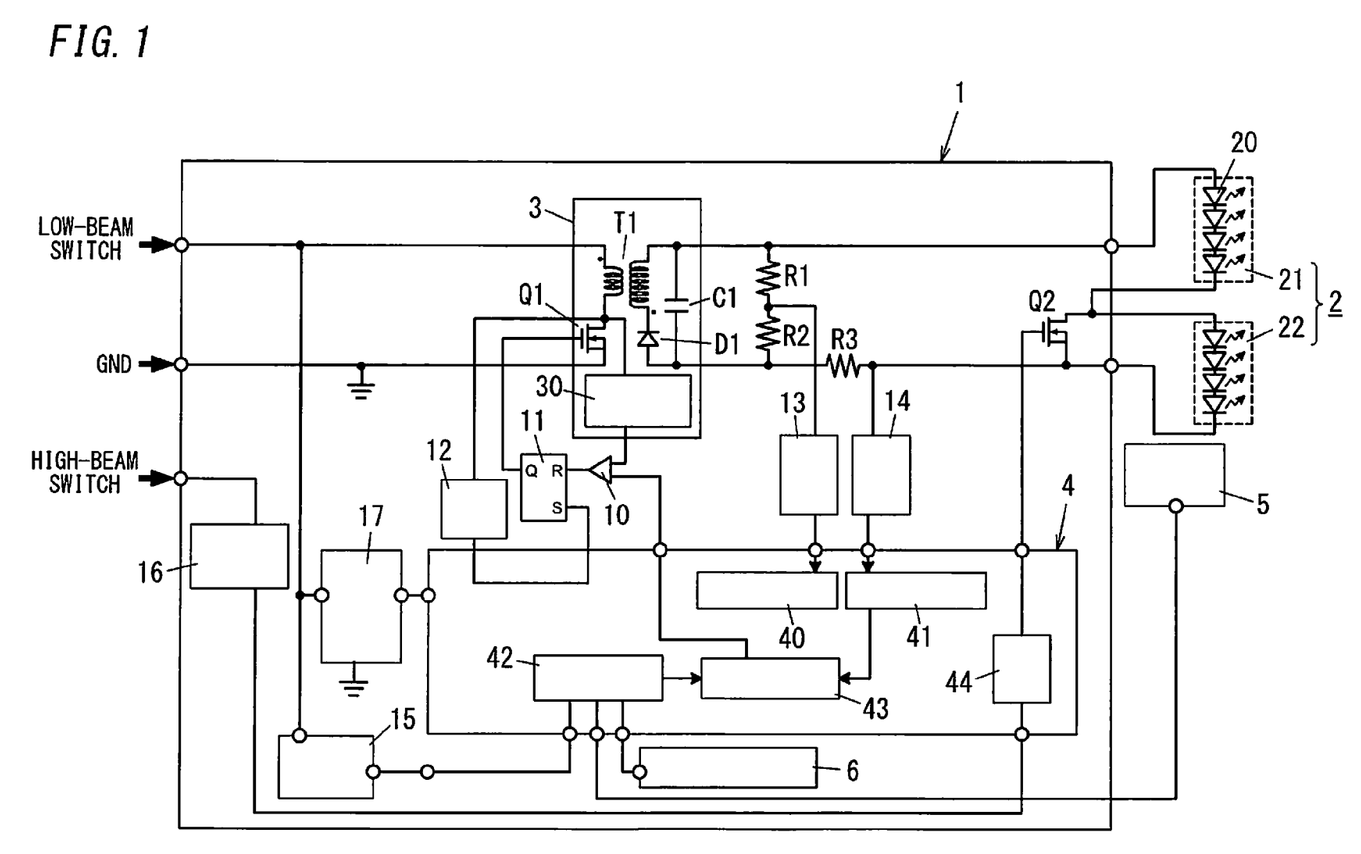
FIG. 1 is a circuit schematic diagram illustrating a lighting device according to First Embodiment.

Hereinafter, a lighting device 1 according to the present embodiment will be specifically described with reference to drawings. As shown in FIG. 1, the lighting device 1 according to the present embodiment is configured to light a load 2, in which a plurality of LEDs (light emitting elements) 20 (here, eight LEDs) are connected in series, by applying a DC voltage to the load 2. In the following description, four LEDs 20 disposed at the high potential side in the load 2 are referred to as a "first light source unit 21", and four LEDs 20 disposed at the low potential side are referred to as the "second light source unit 22". However, the number of LEDs 20 in each of the first and second light source units 21 and 22 is not limited to four. That is, each light source unit may include at least one LED 20.

It is assumed that the lighting device 1 according to the present embodiment is installed to a vehicle as an automobile. Among the LEDs 20 constituting the load 2, the first light source unit 21 is used as a passing light (a low-beam). In addition, the first and second light source units 21 and 22 are used as a running light (a high-beam). In this case, for example, a voltage of 2[V] to 4[V] is applied across each LED 20. In the example of FIG. 1, because the load 2 includes eight LEDs 20, a voltage of 16[V] to 32[V] is applied across the load 2, upon the high-beam.

The lighting device 1 further includes the power converter 3 that is a flyback type DC/DC converter. The power converter 3 is connected to the battery 7 (see FIG. 9) that is a DC power supply, and is configured to boost or reduce a DC voltage applied by the battery 7 to a DC voltage capable of lighting the load 2, and output the boosted or reduced DC voltage. The power converter 3 may be a DC/DC converter other than the flyback type. In addition, the power converter 3 may be connected to an AC/DC converter (not shown), which is configured to convert, to a DC voltage, an AC voltage received from an AC power supply (not shown) and output the DC voltage, instead of the battery 7.

Figure 9:
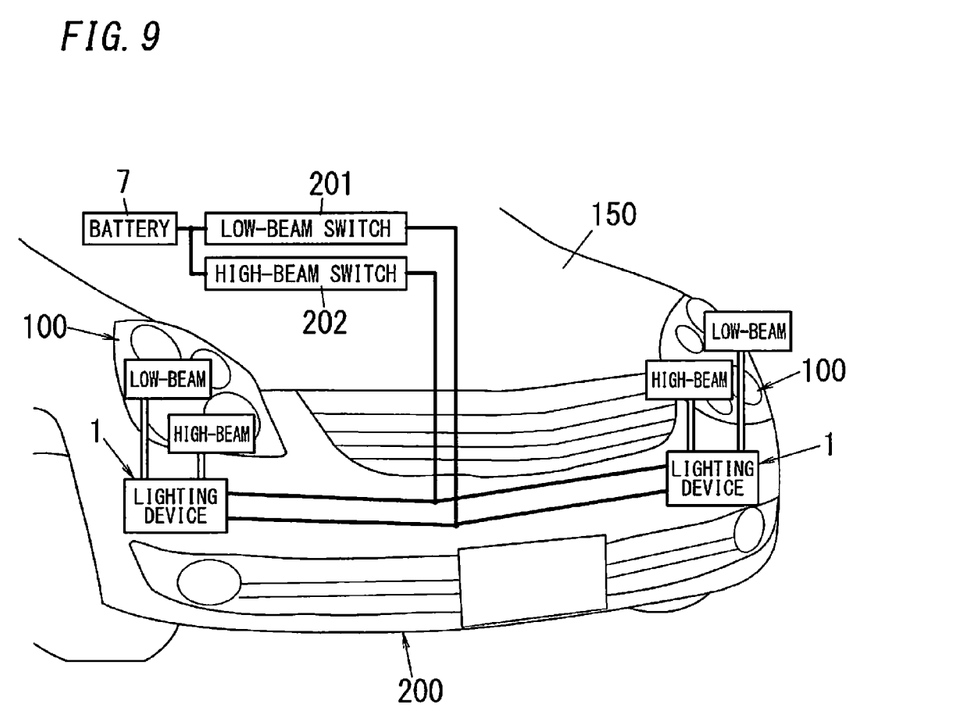
FIG. 9 is a schematic diagram illustrating a vehicle according to an Embodiment.

The power converter 3 is configured to receive the DC voltage from the battery 7 in linkage with on/off of a low-beam switch 201 (see FIG. 9). That is, when the low-beam switch 201 is switched on, the power converter 3 receives the DC voltage from the battery 7. On the other hand, when the low-beam switch 201 is switched off, the supply of the DC voltage from the battery 7 to the power converter 3 is stopped.

The second light source unit 22 is connected in parallel with the second switching element Q2 (the bypass unit) that is an N-channel type MOSFET. The second switching element Q2 is configured to switch on/off, when receiving a switching signal from a switching part 44 described later. In the on-state of the second switching element Q2 (that is, in the first state), the second light source unit 22 is short-circuited, and only the first light source unit 21 is lighted (low-beam). In the off-state of the second switching element Q2 (that is, in the second state), both of the first and second light source units 21 and 22 are lighted (high-beam).

The power converter 3 includes a transformer T1, a first switching element Q1 which is connected in series with a primary winding of the transformer T1, and a capacitor C1 which is connected with a secondary winding of the transformer T1 via a diode D1. A series circuit composed of the primary winding of the transformer T1 and the first switching element Q1 is connected to the battery 7. Therefore, current flows from the secondary winding of the transformer T1 to the capacitor C1 through the diode D1, depending on on/off switching of the first switching element Q1, and accordingly, a DC voltage is generated across the capacitor C1.

Hereinafter, operation of the power converter 3 will be described. When the first switching element Q1 is switched on, current flows through the primary winding of the transformer T1, and accordingly energy is stored in the primary winding. Consequently, a voltage between a drain and source of the first switching element Q1 rises. Here, the power converter 3 further includes a primary-current-measuring part 30 that is configured to measure a primary current flowing through the primary winding of the transformer T1. The primary-current-measuring part 30 is configured to output, to a comparator 10, a voltage that is proportional to the voltage between the drain and source of the first switching element Q1.

The comparator 10 is configured to compare an output value of the primary-current-measuring part 30 with a control value that is output by a comparison calculating part 43 of the microcomputer 4 described later. An output of the comparator 10 is input to a reset (R) of an RS flip-flop circuit 11. When the output value of the primary-current-measuring part 30 exceeds the control value output by the comparison calculating part 43, "1" is input to the reset (R) of an RS flip-flop circuit 11, and accordingly, an output of the RS flip-flop circuit 11 becomes "0" and the first switching element Q1 is switched off.

When the first switching element Q1 is switched off, the energy stored in the primary winding of the transformer T1 is discharged to the secondary side. Then, when the discharge of the energy is completed, the voltage between the drain and source of the first switching element Q1 falls. The falling of the voltage between the drain and source is detected by a differentiation circuit 12. Then, "1" is input to a set (S) of the RS flip-flop circuit 11 due to an output of the differentiation circuit 12. Therefore, the output of the RS flip-flop circuit 11 becomes "1" and the first switching element Q1 is switched on again. In this way, the power converter 3 is controlled by a Boundary Current Mode.

The lighting device 1 is normally configured to light the load 2 by constant current control for controlling a current flowing through the load 2 to a constant level. The control is performed with the microcomputer 4 (controller). Further, the lighting device 1 includes a voltage-measuring circuit 13 and a current-measuring circuit 14. The voltage-measuring circuit 13 is configured to measure, as an output voltage, a voltage applied to the load 2. The current-measuring circuit 14 is configured to measure, as an output current, a current flowing through the load 2. The voltage-measuring circuit 13 is configured to measure the output voltage based on a voltage divided by resistors R1 and R2, which are connected in series across output ends of the power converter 3. The current-measuring circuit 14 is configured to measure the output current based on a voltage across both ends of a resistor R3 which is inserted between the power converter 3 and load 2.

The microcomputer 4 further includes: a first averaging part 40 configured to average the output voltage obtained by the voltage-measuring circuit 13; a second averaging part 41 configured to average the output current obtained by the current-measuring circuit 14; and a current command part 42. The microcomputer 4 is configured to read out a current command value that is previously stored in an internal ROM (not shown) and output the current command value to the current command part 42. The current command part 42 is configured to correct the current command value so as to agree with a value based on a power supply voltage that is measured by a first-power-supply-measuring circuit 15, an ambient temperature of the load 2 that is measured by a first-temperature-measuring unit 5, and an ambient temperature of the microcomputer 4 that is measured by a second-temperature-measuring unit 6.

However, regarding the correction of the current command value, all of the first-power-supply-measuring circuit 15, first-temperature-measuring unit 5 and second-temperature-measuring unit 6 are not necessarily required. That is, one or more of the circuit 15 and the units 5 and 6 may be provided according to the control of the microcomputer 4 (controller) described below.

Here, the first-power-supply-measuring circuit 15 is connected to the battery 7, and configured to measure the DC voltage of the battery 7. The first-temperature-measuring unit 5 includes a thermo-sensitive element, such as a thermistor, and is disposed near the load 2 to measure the ambient temperature of the load 2. The second-temperature-measuring unit 6 includes a thermo-sensitive element, such as a thermistor, and is disposed near the power converter 3 to measure the ambient temperature of the power converter 3.

Then, the microcomputer 4 compares the corrected current command value with an average value of the output current, through the comparison calculating part 43. Then, the microcomputer 4 outputs the control value to the comparator 10 to control the power converter 3 so that the average value agrees with the corrected current command value. Accordingly, the power converter 3 is subjected to the constant current control so that the output current agrees with the constant current command value.

In the following description, the ambient temperature of the load 2 is referred to as a "LED temperature", and the ambient temperature of the power converter 3 is referred to as a "driver temperature". Although not shown, the microcomputer 4 has a function of averaging the power supply voltage obtained by the first-power-supply-measuring circuit 15, a function of averaging the LED temperature obtained by the first-temperature-measuring unit 5, and a function of averaging the driver temperature obtained by the second-temperature-measuring unit 6.

The microcomputer 4 further includes the switching part 44 that is configured to switch a state where only the first light source unit 21 is lighted and a state where both of the first and second light source units 21 and 22 are lighted, by switching on/off of the second switching element Q2 according to the switching signal. When receiving a switch signal from a second-power-supply-measuring circuit 16, the switching part 44 outputs the switching signal. The second-power-supply-measuring circuit 16 outputs the switch signal to the switching part 44 based on the power supply voltage supplied from the battery 7 in linkage with on/off of a high-beam switch 202 (see FIG. 9).

Accordingly, when the high-beam switch 202 is switched on, the second switching element Q2 is switched off through the switching signal and both of the first and second light source units 21 and 22 are lighted as the high-beam. On the other hand, when the high-beam switch 202 is switched off, the second switching element Q2 is switched on through the switching signal and only the first light source unit 21 is lighted as the low-beam.

The microcomputer 4 operates by receiving an operation voltage from a power-supply-generating unit 17. The power-supply-generating unit 17 is connected to the battery 7 and is configured to generate the operation voltage for the microcomputer 4 with the DC voltage supplied from the battery 7.

Figure 2:
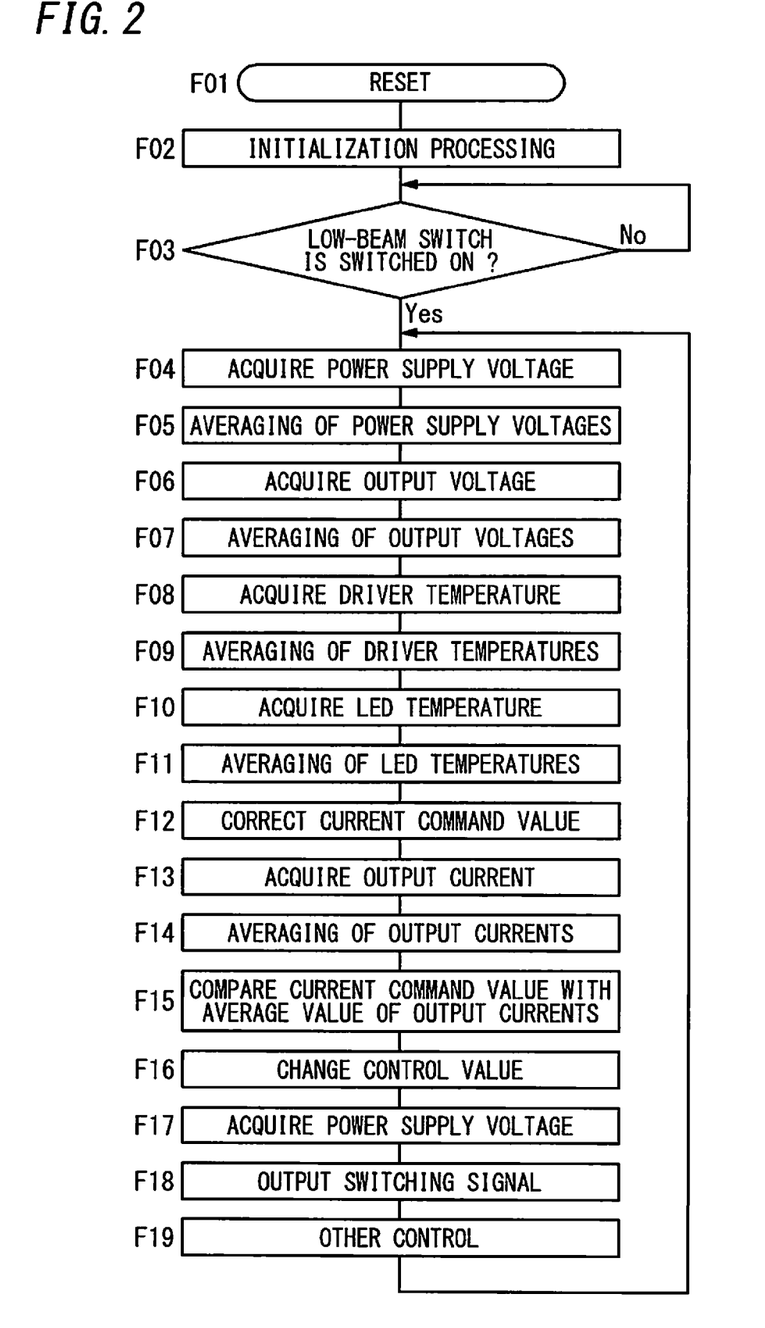
FIG. 2 is a flow chart for describing lighting control in the lighting device according to the First Embodiment.

Hereinafter, the lighting control flow of the microcomputer 4 will be described with reference to FIG. 2. First, when the power supply is switched on and the microcomputer 4 is reset (F01), the microcomputer 4 performs an initialization processing for variables, flags or the like to be used (F02). Next, the microcomputer 4 determines whether or not the low-beam switch 201 is switched on (F03). When the low-beam switch 201 is determined to be switched on, the processing is shifted to a loop (after F04) for lighting the load 2. Regarding F03, specifically, the microcomputer 4 is activated by switching the low-beam switch 201 on, and is configured to compare a voltage measured through the first-power-supply-measuring circuit 15 with a threshold voltage higher than a minimum operating voltage of the microcomputer 4. The microcomputer 4 is also configured to determine that the low-beam switch 201 is switched on if the voltage measured through the first-power-supply-measuring circuit 15 is higher than the threshold voltage.

The microcomputer 4, for lighting the load 2, acquires the power supply voltage through A/D conversion (F04), and adds the power supply voltage to measured values that were acquired in the past, and performs averaging of the power supply voltages (F05). As one example, the microcomputer 4 always stores three values, as the latest measured values (update when acquiring), and when acquiring a new measured value, adds the new measured value to the three values, and performs the averaging by dividing the total by four.

Next, the microcomputer 4 acquires the output voltage of the power converter 3 through A/D conversion (F06), and adds the output voltage to measured values that were acquired in the past, and performs averaging of the output voltages (F07). Then, the microcomputer 4 acquires the driver temperature through A/D conversion (F08), and adds the driver temperature to measured values that were acquired in the past, and performs averaging of the driver temperatures (F09). Then, the microcomputer 4 acquires the LED temperature through A/D conversion (F10), and adds the LED temperature to measured values that were acquired in the past, and performs averaging of the LED temperatures (F11).

Then, the microcomputer 4 reads out the current command value stored in the internal ROM (not shown), and corrects the current command value so as to agree with a value based on an average value of the power supply voltages, an average value of the driver temperatures and an average value of the LED temperatures (F12). Further, the microcomputer 4 acquires the output current of the power converter 3 through A/D conversion (F13), and adds the output current to measured values that were acquired in the past, and performs averaging of the output currents (F14). Then, the microcomputer 4 compares the corrected current command value with an average value of the output currents (F15), and modifies the control value based on the comparison result (F16).

Next, the microcomputer 4 acquires the power supply voltage measured by the second-power-supply-measuring circuit 16 through A/D conversion (F17), and outputs the switching signal based on the power supply voltage linked with on/off of the high-beam switch 202 (F18). Then, the microcomputer 4 performs other control, such as control for determining abnormality in the load 2 or abnormality in the power supply (F19).

Here, even in any case of upon lighting of the low-beam and upon lighting of the high-beam, a conventional lighting device is configured to control an output current so as to be reduced at a constant rate, when a power supply voltage of a battery becomes a reference voltage (here, 10[V]) or less. For this reason, luminous flux of a load is decreased, and accordingly, there is a possibility that sufficient illumination cannot be provided. In particular, in a case where the load is a headlight, the luminous flux of LEDs is decreased sufficiently due to reduction of the power supply voltage upon lighting of the low-beam, and accordingly, there is a possibility that visibility of a driver is reduced.

In order to solve this problem, the microcomputer 4 of the lighting device 1 according to the present embodiment is configured to control the power converter 3 so that a reduction amount of the output current upon lighting of the low-beam (in the first state) is lower than the reduction amount of the output current upon lighting of the high-beam (in the second state). Therefore, the lighting device 1 according to the present embodiment can solve the above-mentioned problem. Here, "the first state where the second light source unit 22 is short-circuited" corresponds to "the on-state of the second switching element Q2", and "the second state where the short-circuiting is opened" corresponds to "the off-state of the second switching element Q2".

Figure 3A:
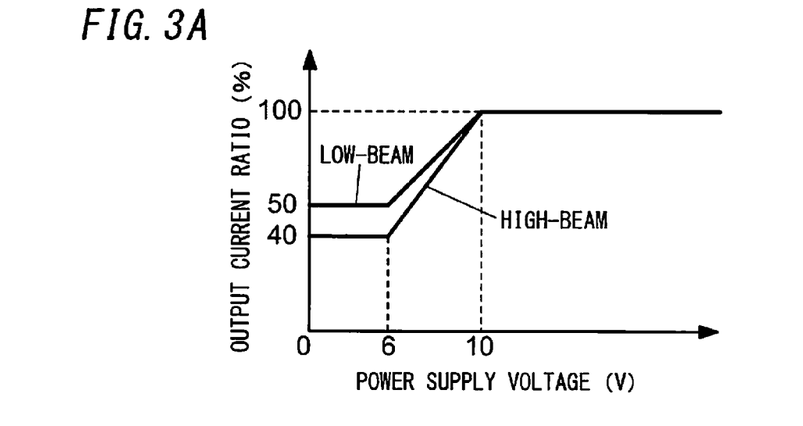
FIG. 3A is a correlation diagram between a power supply voltage and an output current ratio, for describing control of reducing the output current in the lighting device according to the First Embodiment.

Hereinafter, the lighting device 1 will be described, mentioning a concrete example. Here, in the following description, it is assumed that the output current when the power supply voltage is 10[V] corresponds to an output current ratio of 100[%]. As shown in FIG. 3A, the microcomputer 4, upon lighting of the high-beam, controls the power converter 3 so that when the power supply voltage is reduced from 10[V] to 6[V], the output current ratio agrees with 40[%]. On the other hand, the microcomputer 4, upon lighting of the low-beam, controls the power converter 3 so that when the power supply voltage is reduced from 10[V] to 6[V], the output current ratio agrees with 50[%].

That is, the microcomputer 4 controls the power converter 3 so that the reduction amount of the output current upon lighting of the low-beam is lower than the reduction amount of the output current upon lighting of the high-beam. Therefore, in the lighting device 1 according to the present embodiment, because the reduction amount of the output current is low upon lighting of the low-beam (when four LEDs 20 as part of the load 2 are short-circuited), it is possible to obtain sufficient illumination from the load 2 even when the output current to be supplied to the load 2 is reduced. In particular, in a case where the load 2 is a headlight, it is possible to sufficiently secure the luminous flux of the LEDs 20 upon lighting of the low-beam, and accordingly, it is possible to suppress a reduction in visibility of a driver.

Because output power upon lighting of the low-beam is lower than that upon lighting of the high-beam, a circuit loss is small. Therefore, even when the reduction amount of the output current is made low, a failure in the circuit due to an increase of the driver temperature does not occur.

Figure 3B:
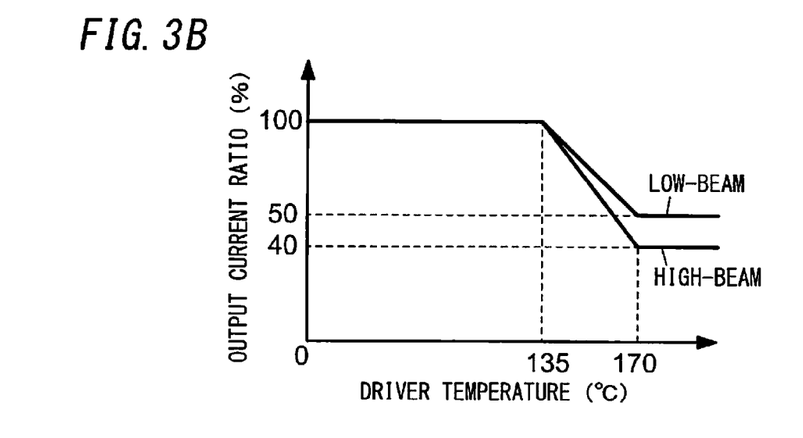
FIG. 3B is a correlation diagram between a driver temperature and the output current ratio, for describing control of reducing the output current in the lighting device according to the First Embodiment.

As shown in FIG. 3B, when the driver temperature becomes the first reference temperature (here, 135 degrees C.) or more, the microcomputer 4 may control the power converter 3 so as to start the reduction of the output current. In this case, it is preferred that the microcomputer 4 controls the power converter 3 so that the reduction amount of the output current upon lighting of the low-beam is lower than the reduction amount of the output current upon lighting of the high-beam, according to an increase of the driver temperature. Also in this case, the same effect as in the above-mentioned case can be obtained.

Figure 3C:
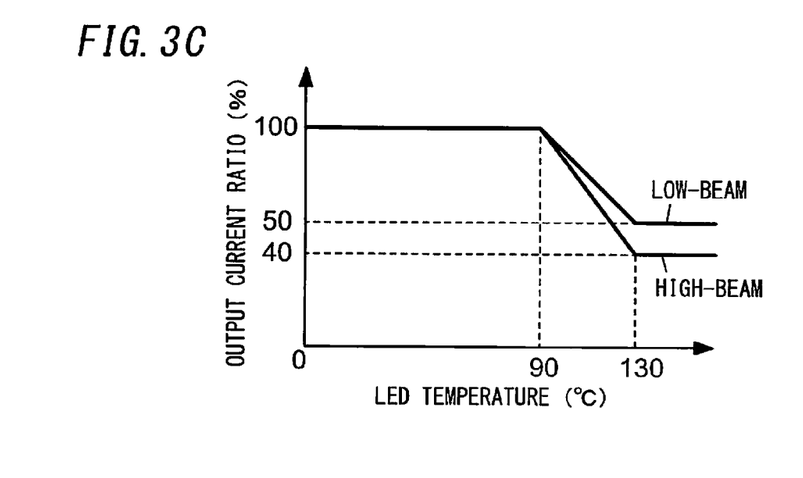
FIG. 3C is a correlation diagram between an LED temperature and the output current ratio, for describing control of reducing the output current in the lighting device according to the First Embodiment.

As shown in FIG. 3C, when the LED temperature becomes the second reference temperature (here, 90 degrees C.) or more, the microcomputer 4 may control the power converter 3 so as to start the reduction of the output current. In this case, it is preferred that the microcomputer 4 controls the power converter 3 so that the reduction amount of the output current upon lighting of the low-beam is lower than the reduction amount of the output current upon lighting of the high-beam, according to an increase of the LED temperature. Also in this case, the same effect as in the above-mentioned case can be obtained.

Here, there is a case where the first and second light source units 21 and 22 are disposed near each other, and the respective heat radiation plates thereof (not shown) are formed integrally with each other or parts of the respective heat radiation plates are connected to each other. In addition, considering an increase of an atmospheric temperature in a housing 101 (see FIG. 8) in which the first and second light source units 21 and 22 are disposed, the atmospheric temperature upon lighting of the low-beam is hardly increased, compared with that upon lighting of the high-beam. Accordingly, even when the reduction amount of the output current upon lighting of the low-beam is suppressed according to the increase of the LED temperature as described above, it is possible to sufficiently suppress an increase in the temperature of the LEDs 20, and it is possible to suppress deterioration that is caused due to heat from the LEDs 20.

Regarding detection of the LED temperature, it is preferred that the first-temperature-measuring unit 5 is disposed near the first light source unit 21, even in any case of upon lighting of the low-beam and upon lighting of the high-beam. However, another first-temperature-measuring unit 5 may be further disposed also near the second light source unit 22. In this case, for example, the first-temperature-measuring unit 5 on the side of the first light source unit 21 may be used upon lighting of the low-beam, and one of the two first-temperature-measuring units 5, which has detected a higher temperature, may be used upon lighting of the high-beam. According to this configuration, it is possible to more securely suppress the deterioration that is caused due to heat from the LEDs 20.

The reference voltage, first reference temperature, second reference temperature and the reduction amount of the output current are not limited to values shown in FIGS. 3A to 3C. In addition, although the output current (output current ratio) is linearly changed in the examples of FIGS. 3A to 3C, the output current may be non-linearly changed or be changed in stages.

Figure 4A:
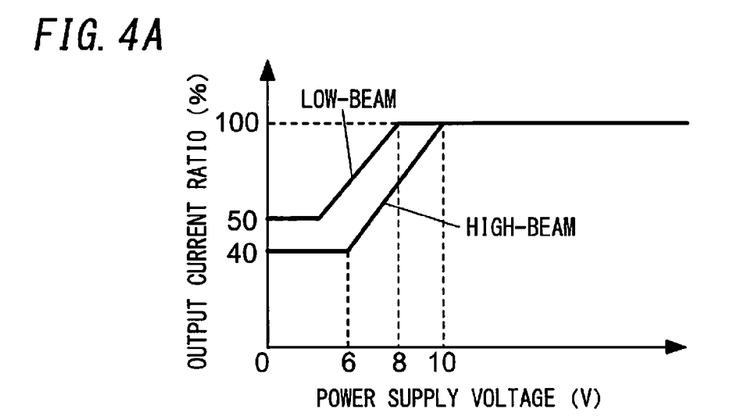
FIG. 4A is a correlation diagram between the power supply voltage and the output current ratio, for describing another control of reducing the output current in the lighting device according to the First Embodiment.

As control for the power converter 3, for example, the microcomputer 4 may be configured to set the reference voltage upon lighting of the low-beam (in the first state) to be lower than the reference voltage upon lighting of the high-beam (in the second state). For example, as shown in FIG. 4A, while the reference voltage upon lighting of the high-beam is set to 10[V], the reference voltage upon lighting of the low-beam is set to 8[V]. In this configuration, the output current (output current ratio) is maintained higher when the power supply voltage is reduced upon lighting of the low-beam, compared with the configuration in FIG. 3A. Accordingly, it is possible to more suppress a reduction in visibility of a driver.

Figure 4B:
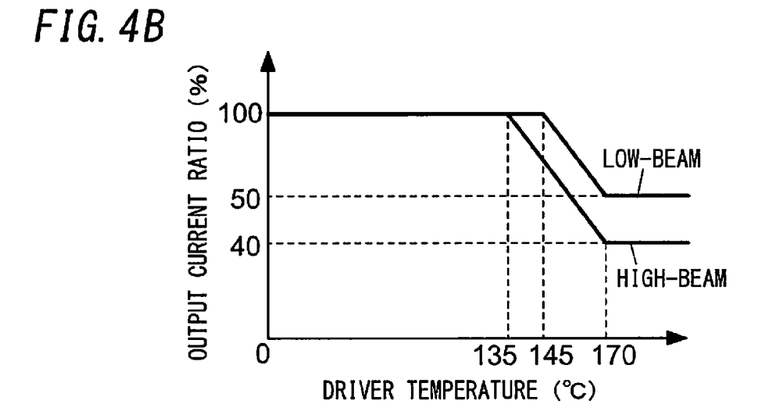
FIG. 4B is a correlation diagram between the driver temperature and the output current ratio, for describing another control of reducing the output current in the lighting device according to the First Embodiment.

Further, the microcomputer 4 may be configured to set the first reference temperature upon lighting of the low-beam to be higher than the first reference temperature upon lighting of the high-beam, and control the power converter 3. For example, as shown in FIG. 4B, while the first reference temperature upon lighting of the high-beam is set to 135 degrees C., the first reference temperature upon lighting of the low-beam is set to 145 degrees C. In this configuration, the output current (output current ratio) is maintained higher when the driver temperature is increased upon lighting of the low-beam, compared with the configuration in FIG. 3B. Accordingly, it is possible to more suppress a reduction in visibility of a driver.

Figure 4C:
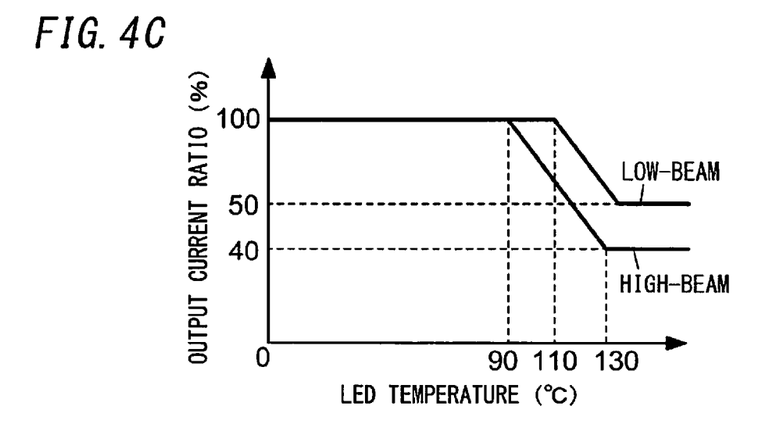
FIG. 4C is a correlation diagram between the LED temperature and the output current ratio, for describing another control of reducing the output current in the lighting device according to the First Embodiment.

Further, the microcomputer 4 may be configured to set the second reference temperature upon lighting of the low-beam to be higher than the second reference temperature upon lighting of the high-beam, and control the power converter 3. For example, as shown in FIG. 4C, while the second reference temperature upon lighting of the high-beam is set to 90 degrees C., the second reference temperature upon lighting of the low-beam is set to 130 degrees C. In this configuration, the output current (output current ratio) is maintained higher when the LED temperature is increased upon lighting of the low-beam, compared with the configuration in FIG. 3C. Accordingly, it is possible to more suppress a reduction in visibility of a driver.

Figure 5A:
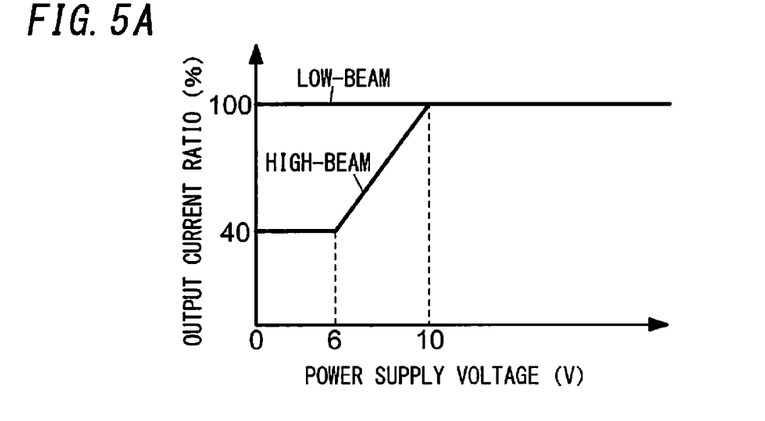
FIG. 5A is a correlation diagram between the power supply voltage and the output current ratio, for describing yet another control of reducing the output current in the lighting device according to the First Embodiment.

As control for the power converter 3, for example, the microcomputer 4 may be configured to control so that the reduction amount of the output current upon lighting of the low-beam agrees with zero. For example, as shown in FIG. 5A, while the reduction of the output current ratio is started when the power supply voltage becomes the reference voltage (10[V]) or less upon lighting of the high-beam, the output current ratio is not reduced upon lighting of the low-beam. In this configuration, it is possible to more suppress a reduction in visibility of a driver upon lighting of the low-beam, compared with the configurations in FIGS. 3A and 4A.

However, because the output current is not reduced upon lighting of the low-beam, a circuit loss becomes larger compared with the configuration where the output current is reduced, and accordingly, there is a concern that a failure in the circuit due to an increase of the driver temperature occurs. In order to more securely prevent the failure in the circuit, it is preferred to design the lighting device 1 so that the circuit loss in the power converter 3 becomes the lowest upon lighting of the low-beam.

Here, when an on-period of the first switching element Q1 in the power converter 3 is shortened, a peak value of a primary current flowing through the primary winding of the transformer T1 becomes high. On the other hand, when the on-period of the first switching element Q1 is lengthened, a peak value of a secondary current flowing through the secondary winding of the transformer T1 becomes high. When the peak value of at least one of the primary and secondary currents becomes high, the circuit loss in the power converter 3 is increased. For this reason, a turn ratio of the transformer T1 in the power converter 3 (the number of turns of the secondary winding/the number of turns of the primary winding) is set to agree with "the output voltage of the power converter 3 upon lighting of the low-beam/the power supply voltage". Therefore, a duty ratio of the first switching element Q1 upon lighting of the low-beam is set near 50[%], and accordingly, it is possible to reduce the peak values of both of the primary and secondary currents, and the circuit loss becomes the smallest.

Figure 5B:
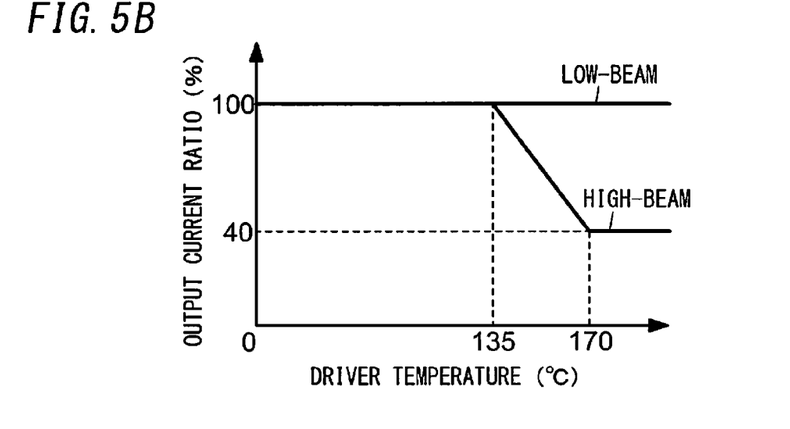
FIG. 5B is a correlation diagram between the driver temperature and the output current ratio, for describing yet another control of reducing the output current in the lighting device according to the First Embodiment.

Further, upon lighting of the low-beam, the microcomputer 4 may be configured to control the power converter 3 so that the output current is not reduced even when the driver temperature is increased. For example, as shown in FIG. 5B, while the reduction of the output current ratio is started when the driver temperature becomes the first reference temperature (135 degrees C.) or more upon lighting of the high-beam, the output current ratio is not reduced upon lighting of the low-beam. In this configuration, it is possible to more suppress a reduction in visibility of a driver upon lighting of the low-beam, compared with the configurations in FIGS. 3B and 4B.

Figure 5C:
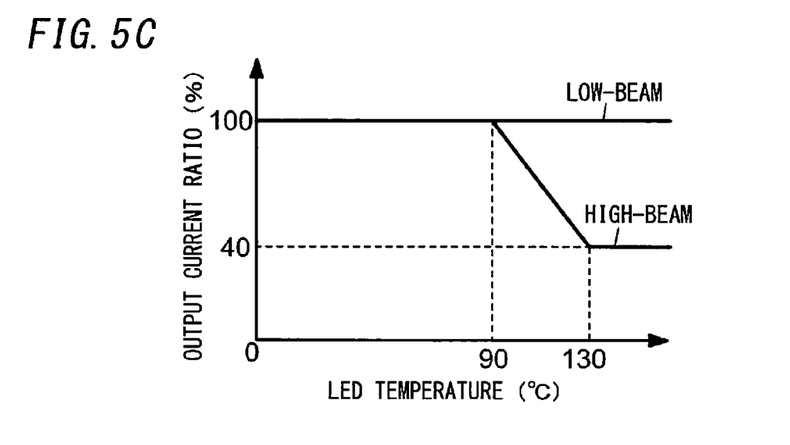
FIG. 5C is a correlation diagram between the LED temperature and the output current ratio, for describing yet another control of reducing the output current in the lighting device according to the First Embodiment.

Further, upon lighting of the low-beam, the microcomputer 4 may be configured to control the power converter 3 so that the output current is not reduced even when the LED temperature is increased. For example, as shown in FIG. 5C, while the reduction of the output current ratio is started when the LED temperature becomes the second reference temperature (90 degrees C.) or more upon lighting of the high-beam, the output current ratio is not reduced upon lighting of the low-beam. In this configuration, it is possible to more suppress a reduction in visibility of a driver upon lighting of the low-beam, compared with the configurations in FIGS. 3C and 4C.

(Second Embodiment)

Hereinafter, a lighting device 1 according to the present embodiment will be described with reference to drawings. Because a basic configuration of the lighting device 1 according to the present embodiment is similar to that of the lighting device 1 according to the First Embodiment, components similar to the First Embodiment are assigned with same reference numerals, and explanations thereof will be appropriately omitted.

If at least a part of a plurality of LEDs 20 in a first light source unit 21 and a second light source unit 22 is short-circuited due to a failure, an output voltage of a power converter 3 becomes reduced. In this case, when an output current is made reduced, the luminous flux of the LEDs 20 is drastically decreased, and accordingly, there is a possibility that visibility of a driver is extremely reduced.

Figure 6A:
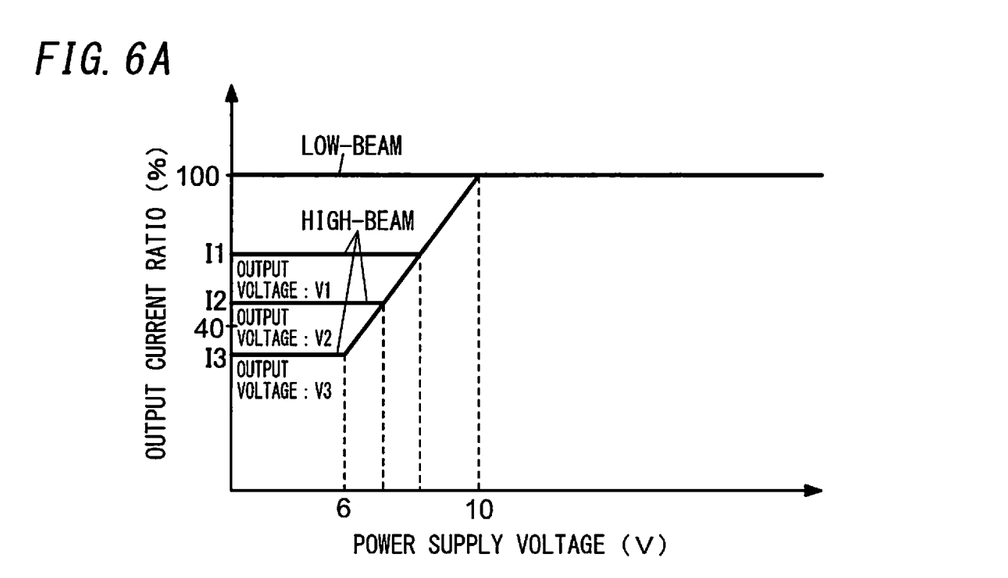
FIG. 6A is a correlation diagram between a power supply voltage and an output current ratio in a lighting device according to Second Embodiment.

In order to solve this problem, a microcomputer 4 of the lighting device 1 according to the present embodiment is configured to control the power converter 3 so that the reduction amount of the output current is more increased, as the output voltage of the power converter 3 is higher. For example, as shown in FIG. 6A, it is assumed that, upon lighting of a high-beam, a lower limit of an output current ratio is "I1" when a value of the output voltage is "V1". When a value of the output voltage becomes "V2" that is higher than "V1", the microcomputer 4 controls the power converter 3 so that the lower limit of the output current ratio upon lighting of the high-beam agrees with "I2" that is lower than "I1". Similarly, when a value of the output voltage becomes "V3" that is higher than "V2", the microcomputer 4 controls the power converter 3 so that the lower limit of the output current ratio upon lighting of the high-beam agrees with "I3" that is lower than "I2".

As described above, the lighting device 1 according to the present embodiment can suppress the reduction amount of the output current, when a part of the LEDs 20 is short-circuited due to a failure and the output voltage is decreased. Accordingly, in the lighting device 1 according to the present embodiment, the luminous flux of the LEDs 20 is not reduced more than necessary. Therefore, it is possible to secure the minimum necessary luminous flux of the LEDs 20 of a degree so that there is no trouble with driving of a vehicle, and secure visibility of a driver. The output current in this case is lower than the output current in a case where the LEDs 20 are in a normal state (none of the LEDs 20 is short-circuited), and accordingly, even when the reduction amount of the output current is made reduced, the failure in the circuit due to the increase of the driver temperature does not occur.

Here, in the example of FIG. 6A, the microcomputer 4 performs control of reducing the output current, according to a reduction of the power supply voltage. However, the control may be applied to other control. For example, the control in the lighting device 1 according to the present embodiment may be applied to the control of reducing the output current according to the increase of the driver temperature or the control of reducing the output current according to the increase of the LED temperature, as described in the First Embodiment.

Figure 6B:
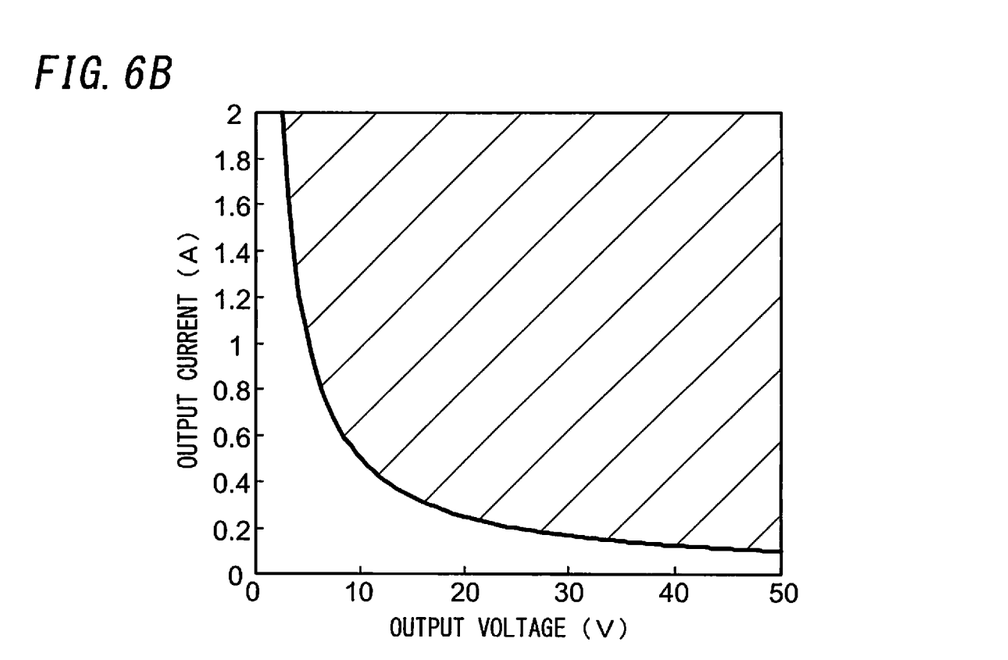
FIG. 6B is a correlation diagram between an output current and an output voltage in the lighting device according to the Second Embodiment.

As shown in FIG. 6B, the microcomputer 4 may be configured to set the reduction amount of the output current so that output power (=the output current×the output voltage) of the power converter 3 is reference power or more (a hatched range in FIG. 6B). Needless to say, the reference power shown in FIG. 6B is one example, and may be set to another value. This control may be adopted together with each of the controls of reducing the output current that were described above. For example, it is considered that this control is adopted together with the control of reducing the output current according to the reduction of the power supply voltage as shown in FIG. 3A. In this case, a larger current command value may be selected from the current command value for the output current based on the power supply voltage and the current command value for the output current based on the output power, and then the microcomputer 4 may control the power converter 3, using the selected current command value.

(Third Embodiment)

Hereinafter, a lighting device 1 according to the present embodiment will be described with reference to drawings. Because a basic configuration of the lighting device 1 according to the present embodiment is similar to that of the lighting device 1 according to the First Embodiment, components similar to the First Embodiment are assigned with same reference numerals, and explanations thereof will be appropriately omitted. A microcomputer 4 of the lighting device 1 according to the present embodiment is configured to control a power converter 3 so that a change rate S2 of an output current upon switching a high-beam switch 202 (that is, switching to a first state or a second state) is lower than a change rate S1 of the output current upon switching on a low-beam switch 201 (switching on a power supply). Here, "switching the high-beam switch 202" means "switching on/off of a second switching element Q2", and, in addition, means "switching to the first state where a second light source unit 22 is short-circuited, or the second state where the short-circuiting is opened".

Figure 7:
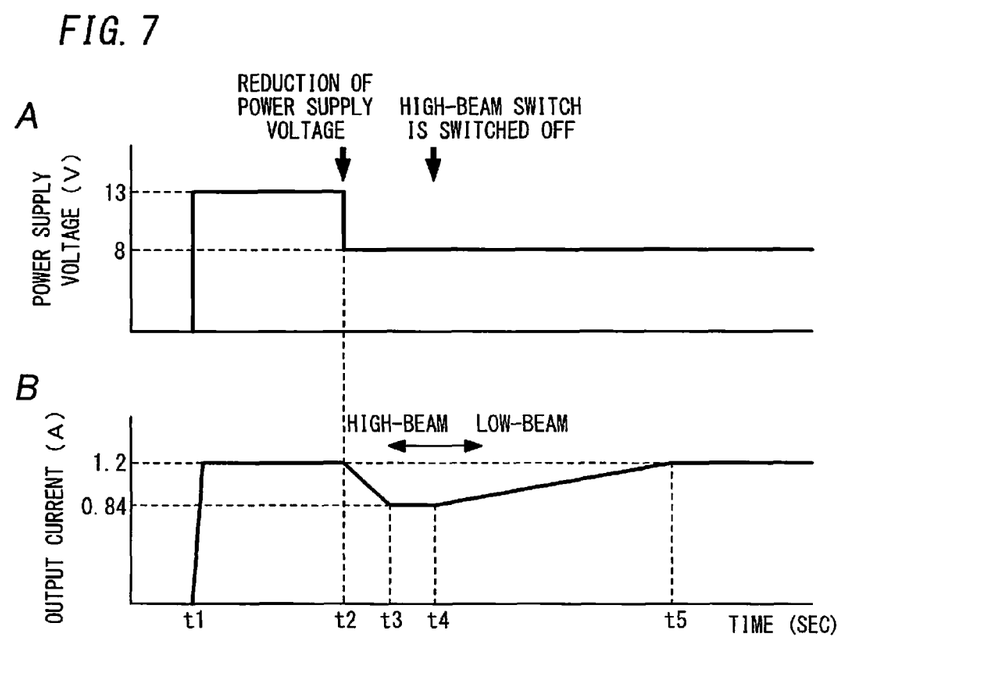
FIG. 7 is a waveform chart relating to a lighting device according to Third Embodiment, where A is a waveform chart of a power supply voltage and B is a waveform chart of an output current.

Hereinafter, the lighting device 1 will be described, mentioning a concrete example, with reference to FIG. 7. In FIG. 7, A and B respectively show a change in a power supply voltage and a change in the output current, in a case where the low-beam switch 201 and high-beam switch 202 are switched on at a time t1, and then the power supply voltage falls at a time t2, and then the high-beam switch 202 is switched off at a time t4.

When both of the low-beam switch 201 and high-beam switch 202 are switched on at the time t1, the microcomputer 4 controls the power converter 3 so that the output current is increased by the change rate S1. Then, when the power supply voltage falls at the time t2, the microcomputer 4 controls the power converter 3 so that the output current is reduced to a current command value based on the power supply voltage, by the change rate S2 (|a value of S2|<|a value of S1|). Then, the output current reaches the current command value at a time t3. Then, when the high-beam switch 202 is switched off at the time t4, the output current is increased because the reduction amount of the output current upon lighting of the low-beam is more suppressed compared with that upon lighting of the high-beam. At this time, the microcomputer 4 controls the power converter 3 so that the output current is increased to a current command value based on the power supply voltage, by a change rate S3 (|a value of S3|<|a value of S2|). Then, the output current reaches the current command value at a time t5. Here, when the low-beam switch 201 is switched off, all of the LEDs 20 are turned off regardless of on/off of the high-beam switch 202, and accordingly, in the present embodiment, the operation of "switching on the power supply" includes at least the operation of "switching on the low-beam switch 201". That is, in the example of FIG. 7, the operation of "switching on both of the low-beam and high-beam switches 201 and 202 at the time t1" is included in the operation of "switching on the power supply".

When switching on both of the low-beam and high-beam switches 201 and 202 (switching on the power supply), it is required to rapidly secure visibility of a driver, and accordingly, it is required to rapidly increase the luminous flux of the LEDs 20. Therefore, an absolute value of the change rate S1 of the output current is set to be higher than absolute values of the other change rates S2 and S3 of the output currents. For example, the output current is rapidly increased to the current command value (1.2[A] in the example of B in FIG. 7) for about 50[ms] after the switching on of the low-beam and high-beam switches 201 and 202.

When the power supply voltage is reduced, it is required to slowly reduce the output current in order to prevent the increase of the circuit loss in the power converter 3. Accordingly, the absolute value of the change rate S2 of the output current is set to be lower than the absolute value of the change rate S1 of the output current when switching on both of the low-beam and high-beam switches 201 and 202.

When switching off the high-beam switch 202, it is required to change the output current as slowly as possible in order to prevent giving, to a driver, uncomfortable feeling (such as flicker or afterimage) due to a change in the luminous flux of the LEDs 20. Accordingly, the absolute value of the change rate S3 of the output current is set to be lower than the absolute values of the other change rates 51 and S2 of the output current. For example, when the output current is changed by a change rate of 0.1[A/sec] or less, the uncomfortable feeling is hardly given to the driver.

As described above, the lighting device 1 according to the present embodiment can rapidly increase the luminous flux of the LEDs 20 when switching on the power supply, and change the luminous flux of the LEDs 20 while preventing giving the uncomfortable feeling to the driver when switching the low-beam and the high-beam.

In the example of FIG. 7, the relationship among the change rates S1 to S3 of the output current is defined as "|a value of S1|>|a value of S2|>|a value of S3|". However, the absolute value of the change rate S2 may be equal to that of the change rate S3.

The lighting device 1 according to each of the above embodiments is configured to control a luminous level of the load 2 by changing the output current of the power converter 3. However, the same effect can be provided also in a case of a lighting device configured to control the luminous level of the load 2 by PWM (Pulse Width Modulation) control. In this lighting device, a duty ratio of the first switching element Q1 in the power converter 3 may be changed, instead of the reduction amount of the output current being changed.

Figure 8:
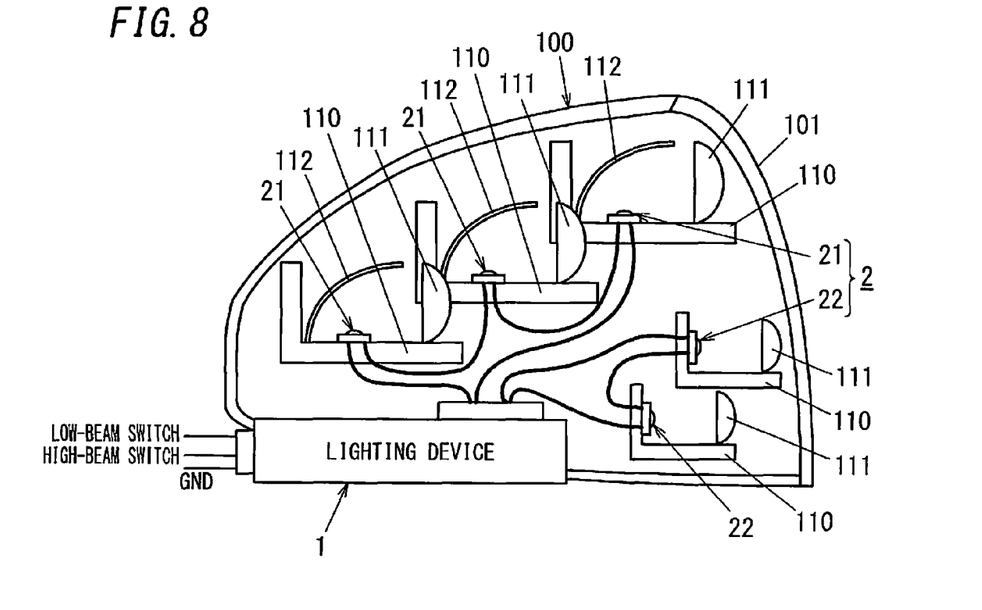
FIG. 8 is a schematic diagram illustrating a headlight apparatus according to an Embodiment.

Hereinafter, a headlight apparatus 100 according to an Embodiment will be described with reference to FIG. 8. As shown in FIG. 8, the headlight apparatus 100 according to this Embodiment includes: the lighting device 1 according to any one of the First to Third Embodiments; a load 2 (in FIG. 8, the load 2 is configured by three first light source units 21 connected in series and two second light source units 22 connected in series); and a housing 101 that houses the load 2. Each of the first and second light source units 21 and 22 is installed at a lamp body 110. Each of lamp bodies 110, at which the first light source units 21 are installed, is provided with a lens 111 and a reflecting plate 112. Each of lamp bodies 110, at which the second light source units 22 are installed, is provided with a lens 111.

Hereinafter, a vehicle 200 according to an Embodiment will be described with reference to FIG. 9. As shown in FIG. 9, the vehicle 200 according to this Embodiment includes: a pair of headlight apparatuses 100; and a vehicle body 150 to which the headlight apparatuses 100 are installed. A lighting device 1 of each headlight apparatus 100 is connected to a low-beam switch 201 and a high-beam switch 202 which are disposed near a driver's seat in the vehicle 200. Accordingly, a low-beam (first light source units 21 in each headlight apparatus 100) is lighted by switching on the low-beam switch 201. Further, a high-beam (first light source units 21 and second light source units 22 in each headlight apparatus 100) is lighted by switching on the high-beam switch 202.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present teachings.

The invention claimed is:

1. A lighting device, comprising:
a power converter configured to convert DC power that is received from a power supply, and supply an output obtained by the conversion to a load in which a plurality of light emitting elements are connected in series;
a bypass unit configured to short-circuit at least one light emitting element of the plurality of light emitting elements, as part of the load;
a controller configured to control the power converter,
the controller being configured to control switching a first state where the at least one light emitting element is short-circuited by the bypass unit, and a second state where the short-circuiting is opened; and
a circuit configured to output a switch signal to the controller in linkage with on/off of a high-beam switch,
the controller being configured to control switching to the second state when the high-beam switch is on, and to control switching to the first state when the high-beam switch is off,
the controller being configured to reduce an output current of the power converter, in at least one of:
a case where a power supply voltage of the power supply is equal to a reference voltage or less;
a case where a temperature of the power converter is equal to a first reference temperature or more; and
a case where a temperature of the load is equal to a second reference temperature or more,
the controller being configured to set a reduction rate of the output current in the first state to be a rate lower than the reduction rate of the output current in the second state.

2. The lighting device according to claim 1,
wherein the controller is configured to set the reference voltage in the first state to be lower than the reference voltage in the second state.

3. The lighting device according to claim 2,
wherein the controller is configured to set the first reference temperature in the first state to be higher than the first reference temperature in the second state.

4. The lighting device according to claim 3,
wherein the controller is configured to set the second reference temperature in the first state to be higher than the second reference temperature in the second state.

5. The lighting device according to claim 2,
wherein the controller is configured to set the second reference temperature in the first state to be higher than the second reference temperature in the second state.

6. The lighting device according to claim 1,
wherein the controller is configured to set the first reference temperature in the first state to be higher than the first reference temperature in the second state.

7. The lighting device according to claim 6,
wherein the controller is configured to set the second reference temperature in the first state to be higher than the second reference temperature in the second state.

8. The lighting device according to claim 1,
wherein the controller is configured to set the second reference temperature in the first state to be higher than the second reference temperature in the second state.

9. The lighting device according to claim 1,
wherein the controller is configured to set a reduction amount of the output current in the first state to be zero.

10. The lighting device according to claim 1,
wherein the controller is configured to set a reduction amount of the output current in the first state to increase as an output voltage of the power converter increases.

11. The lighting device according to claim 1,
wherein the controller is configured to set a reduction amount of the output current so that output power of the power converter equals a reference power or more.

12. The lighting device according to claim 1,
wherein the controller is configured to control so that an absolute value of a change rate of the output current upon switching to the first state or the second state is lower than the absolute value of the change rate of the output current upon switching on the power supply.

13. A headlight apparatus, comprising the lighting device according to claim 1, the load, and a housing that houses the load.

14. A vehicle, comprising the headlight apparatus according to claim 13, and a vehicle body to which the headlight apparatus is installed.

* * * * *